US012747403B2

(12) United States Patent
Nisnevitch et al.

(10) Patent No.: US 12,747,403 B2
(45) Date of Patent: Sep. 29, 2026

(54) PRODUCTION OF BIODIESEL

(71) Applicant: Ariel Scientific Innovations Ltd., Ariel (IL)

(72) Inventors: Marina Nisnevitch, Doar-Na Lev HaSharon (IL); Faina Nakonechny, Ariel (IL); Mirit Kolet, Petach-Tikva (IL); Daniel Zarbib, Kfar Yona (IL); Yael Albo, Petach-Tikva (IL)

(73) Assignee: Ariel Scientific Innovations Ltd., Ariel (IL)

( * ) Notice: Subject to any disclaimer, the term of this patent is extended or adjusted under 35 U.S.C. 154(b) by 0 days.

(21) Appl. No.: 17/289,820

(22) PCT Filed: Nov. 1, 2019

(86) PCT No.: PCT/IB2019/059382

§ 371 (c)(1),
(2) Date: Apr. 29, 2021

(87) PCT Pub. No.: WO2020/089843

PCT Pub. Date: May 7, 2020

(65) Prior Publication Data

US 2021/0395628 A1 Dec. 23, 2021

Related U.S. Application Data

(60) Provisional application No. 62/754,033, filed on Nov. 1, 2018.

(51) Int. Cl.

| | |
|---|---|
| ***C10L 1/02*** | (2006.01) |
| ***B01J 19/10*** | (2006.01) |
| ***C11C 3/00*** | (2006.01) |

(52) U.S. Cl.
CPC ............... *C10L 1/026* (2013.01); *B01J 19/10* (2013.01); *C11C 3/003* (2013.01); *C10L 2200/0476* (2013.01)

(58) Field of Classification Search
CPC ... C10L 1/026; C10L 2200/0476; B01J 19/10; C11C 3/003; C11C 3/00
See application file for complete search history.

(56) References Cited

U.S. PATENT DOCUMENTS

| | | | | |
|---|---|---|---|---|
| 2008/0184616 A1 | 8/2008 | Misra et al. | | |
| 2009/0000941 A1* | 1/2009 | Kropf | C11C 3/003 | 422/128 |

(Continued)

FOREIGN PATENT DOCUMENTS

| | | |
|---|---|---|
| CN | 1522293 | 8/2004 |
| CN | 1894390 | 1/2007 |

(Continued)

OTHER PUBLICATIONS

International Preliminary Report on Patentability Dated May 14, 2021 From the International Bureau of WIPO Re. Application No. PCT/IB2019/059382. (6 Pages).

(Continued)

*Primary Examiner* — Latosha Hines

(57) ABSTRACT

A process of generating an alkyl ester of a fatty acid (e.g., a biodiesel) from a free fatty acid-containing substance (e.g., a feedstock), is provided. The process is effected by contacting a mixture of the free fatty acid-containing substance and a respective alcohol with Lewis Acid; and, while contacting, exposing the mixture and the Lewis acid to ultrasound energy. An alkyl ester of a fatty acid, or a mixture of two or more alkyl esters of fatty acids, (e.g., a biodiesel), obtainable by the process, are also provided.

18 Claims, 9 Drawing Sheets

(56) References Cited

U.S. PATENT DOCUMENTS

Figure 1A:
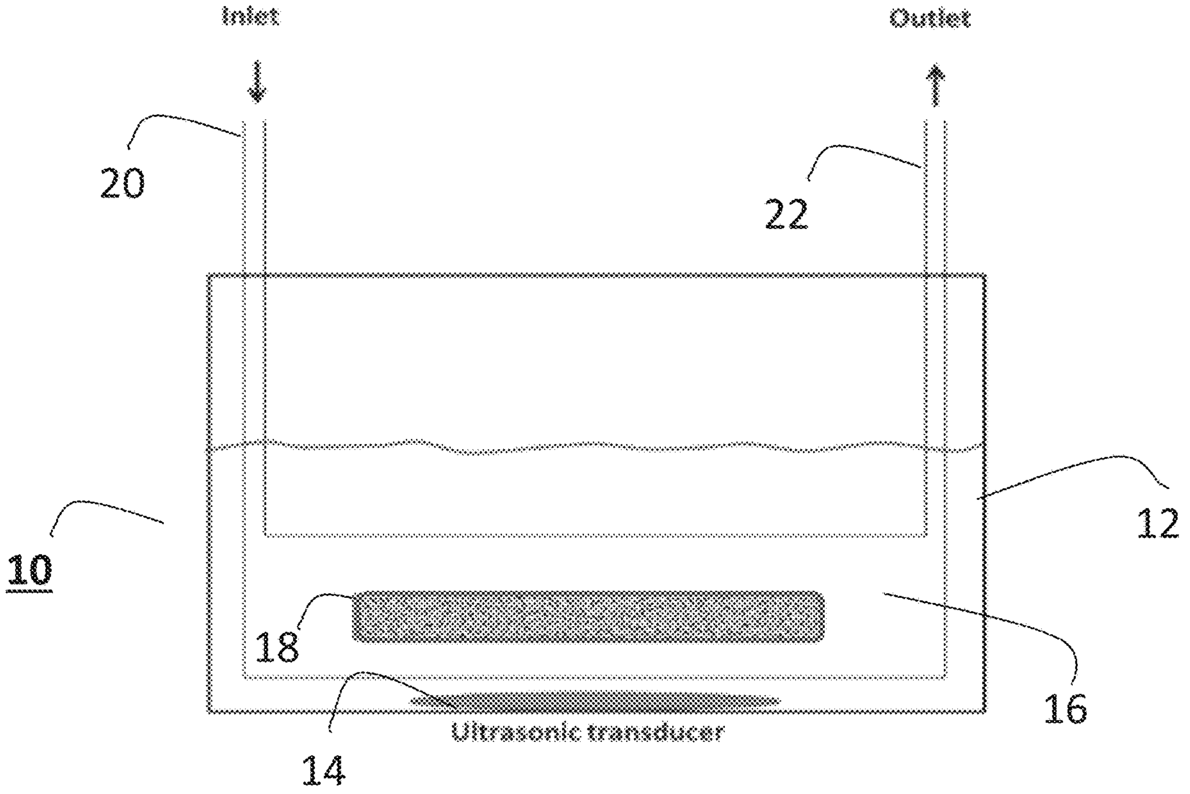

| | | | | |
|---|---|---|---|---|
| 2010/0130763 | A1 | 5/2010 | Gao | |
| 2010/0163402 | A1 | 7/2010 | Seo | |
| 2010/0175309 | A1* | 7/2010 | Kozyuk | C10L 1/026 44/388 |
| 2011/0197497 | A1* | 8/2011 | Jiang | C11B 3/006 137/13 |
| 2011/0245523 | A1* | 10/2011 | Pottathil | C11C 3/10 554/162 |
| 2012/0240452 | A1* | 9/2012 | Erdoes, Jr. | B01J 8/006 44/388 |
| 2016/0230106 | A1* | 8/2016 | Ruan | C11B 3/04 |

FOREIGN PATENT DOCUMENTS

| | | | |
|---|---|---|---|
| CN | 101812379 | | 8/2010 |
| CN | 105073706 | | 11/2015 |
| KR | 101524494 | B1 * | 5/2015 |
| WO | WO 2020/089843 | | 5/2020 |
| WO | WO 2020/089843 | A9 | 2/2021 |

OTHER PUBLICATIONS

Notification of Office Action and Search Report Dated Jun. 22, 2022 From the State Intellectual Property Office of the People's Republic of China Re. Application No. 201980077466.2. (7 Pages).

International Search Report and the Written Opinion Dated Jan. 23, 2020 From the International Searching Authority Re. Application No. PCT/IB2019/059382. (9 Pages).

Banerjee et al. "Parametric Sensitivity in Transesterification of Waste Cooking Oil for Biodiesel Production—A Review", Resources, Conservation and Recycling, 53(9):490-497, Available Online May 13, 2009.

Barbosa et al. "Solvent Free Esterification Reactions Using Lewis Acids in Solid Phase Catalysis", Applied Catalysis A: General, 313(2): 146-150, Oct. 4, 2006.

Canakci et al. "Biodiesel Production From Oils and Fats With High Free Fatty Acids", Transactions of the ASAE, 44(6): 1429-1436, 2001.

Casas et al. "Tin Compounds as Lewis Acid Catalysts for Esterification and Transesterification of Acid Vegetable Oils", Fuel Processing Technology, 106: 321-325, Available Online Sep. 15, 2012.

Chai et al. "Esterification Pretreatment of Free Fatty Acid in Biodiesel Production, From Laboratory to Industry", Fuel Processing Technology, 125: 106-113, Sep. 2014.

Chakrabarti et al. "4Waste Grease Biodiesel Production at A Wastewater Treatment Plant", Proceedings of the Water Environment Federation, WEFTEC 2008: Session 31 Through Session 40, p. 2770-2789, Jan. 1, 2008.

Cintas et al. "A New Pilot Flow Reactor for High-Intensity Ultrasound Irradiation. Application to the Synthesis of Biodiesel", Ultrasonics Sonochemistry, 17(6): 985-989, Available Online Dec. 21, 2009.

Encinar et al. "Transesterification of Castor Oil Under Ultrasonic Irradiation Conditions. Preliminary Results", Fuel Processing Technology, 103: 9-15, Available Online Jan. 18, 2012.

Gabel ct al. "Sustainability Incorporated Into the Solids Handling Improvements of the Douglas L. Smith Middle Basin Wastewater Treatment Plant", Proceedings of the Water Environment Federation, Residuals and Biosolids 2009, p. 527-540, Jan. 1, 2009.

He et al. "Evidence for Fat, Oil, and Grease (FOG) Deposit Formation Mechanisms in Sewer Lines", Environmental Science & Technology, 45(10): 4385-4391, Published Online Apr. 21, 21901.

Hingu et al. "Synthesis of Biodiesel From Waste Cooking Oil Using Sonochemical Reactors", Ultrasonics Sonochemistry, 17(5): 827-832, Available Online Feb. 21, 2010.

Kolet et al. "Production of Biosiesel From Brown Grease", The 53rd Annual Meeting of the Israel Institute of Chemical Engineers, Conference & Exhibition, Tel Aviv, Israel, Jun. 24, 2018. Abstract.

Lam ct al. "Homogencous, Heterogeneous and Enzymatic Catalysis for Transesterification of High Frec Fatty Acid Oil (Waste Cooking Oil) to Biodiesel: A Review", Biotechnology Advances, 28(4): 500-518, Available Online Mar. 31, 2010.

Long et al. "Anaerobic Co-Digestion of Fat, Oil, and Grease (FOG): A Review of Gas Production and Process Limitations", Process Safety and Environmental Protection, 90(3): 231-245, May 2012.

Meher et al. "Technical Aspects of Biodiesel Production by Transesterification—A Review", Renewable & Sustainable Energy Reviews, 10(3): 248-268, Jun. 2006.

Nisnevitch et al. "Biodiesel Production From Brown Grease", 2018 Sustainable Industrial Processing Summit and Exhibition, SIPS 2018, Rio de Janeiro, Brazil, Nov. 4-7, 2018, New and Advanced Materials and Technologies, 6: 215-216, Nov. 4, 2018.

Pukale et al. "Ultrasound Assisted Transesterification of Waste Cooking Oil Using Heterogeneous Solid Catalyst", Ultrasonic Sonochemistry, 22: 278-286, Available Online Jun. 2, 2014.

Rajkovic et al. "Optimization of Ultrasound-Assisted Base-Catalyzed Methanolysis of Sunflower Oil Using Response Surface and Artificial Neural Network Methodologies", Chemical Engineering Journal, 215-216: 82-89, Available Online Nov. 10, 2012.

Romero et al. "Biodiesel Production by Using Heterogeneous Catalysts", Alternative Fuel, Chap. 1: 3-20, 2011.

Salamatinia et al. "Quality Evaluation of Biodiesel Produced Through Ultrasound-Assisted Heterogeneous Catalytic System", Fuel Processing Technology, 97: 1-8, Available Online Feb. 3, 2012.

Santos et al. "Comparison Study of Lewis Acid Type Catalysts on the Esterification of Octanoic Acid and N-Octyl Alcohol", Chemical Engineering & Technology, 19(6), 538-542, Dec. 1996.

Sun et al. "ZrOCI2•8H2O: An Efficiant, Cheap and Reusable Catalyst for the Esterificiation of Acrylic Acid and Other Carboxylic Acids With Equimolar Amounts of Alcohols", Molecules, 11(4): 263-271, Published Online Apr. 10, 2006.

Suto et al. "Innovative Anaerobic Digestion Investigation of Fats, Oils, and Grease", Proceedings of the Water Environment Federation, Residuals and Biosolids Management Conference 2006, p. 858-879, Jan. 1, 2006.

Talha ct al. "Overview of Catalysts in Biodiesel Production", ARPN Journal of Engineering and Applied Sciences, 1191): 439-448, Jan. 2016.

Teixeira et al. "Comparison Between Conventional and Ultrasonic Preparation of Beef Tallow Biodiesel", Fuel Processing Technology, 90(9): 1164-1166, Sep. 2009.

Wang et al. "Anaerobic Co-Digestion of Grease Trap Waste", Proceedings of the Water Environment Federation, Session 71 Through Session 80, WEFTEC 2012, p. 5428-5434, Jan. 1, 2012.

Examination Report Under Sections 12 & 13 of the Patents Act, 1970 and the Patents Rules, 2003 Dated Oct. 19, 2022 From the Government of India, Intellectual Property India, Patent, Designs, Trade Marks, Geographical Indications, The Patent Office Re. Application No. 202127019358. (7 Pages).

English Summary Dated Jul. 5, 2022 of Notification of Office Action and Search Report Dated Jun. 22, 2022 From the State Intellectual Property Office of the People's Republic of China Re. Application No. 201980077466.2. (3 Pages).

Supplementary European Search Report and the European Search Opinion Dated Jun. 22, 2022 From the European Patent Office Re. Application No. 19879139.4. (10 Pages).

Borugadda et al. "Biodiesel Production From Renewable Feedstocks: Status and Opportunities", Renewable and Sustainable Energy Reviews, XP028408319, 16(7): 4763-4784, Available Online Jun. 27, 2012.

Mohod et al. "Intensified Synthesis of Medium Chain Triglycerides Using Ultrasonic Reactors at a Capacity of 4L", Ultrasonics Sonochemistry, XP085345930, 42: 347-355, Published Online Dec. 2, 2017.

Stavarache et al. "Ultrasonic Versus Silent Methylation of Vegetable Oils", Ultrasonics Sonochemistry, XP005434591, 13(5): 401-407, Available Online Oct. 19, 2005.

(56) References Cited

OTHER PUBLICATIONS

Communication Pursuant to Article 94(3) EPC Dated Jan. 2, 2024 From the European Patent Office Re. Application No. 19879139.4 (7 Pages).

* cited by examiner

| %Biodiesel | (min) |
|---|---|
| 85.00 | 1 |
| 92.56 | 2 |
| 97.32 | 5 |
| 95.79 | 10 |

PRODUCTION OF BIODIESEL

RELATED APPLICATIONS

This application is a National Phase of PCT Patent Application No. PCT/IB2019/059382 having an international filing date of Nov. 1, 2019, claims the benefit of priority under 35 USC § 119(e) of U.S. Provisional Patent Application No. 62/754,033 filed on Nov. 1, 2018. The contents of the above applications are all incorporated by reference as if fully set forth herein in their entirety.

FIELD AND BACKGROUND OF THE INVENTION

The present invention, in some embodiments thereof, relates to biodiesel production and, more particularly, but not exclusively, to a novel process for producing biodiesel from oily substances, such as substances that contain free fatty acid(s). In some embodiments, the process is usable for generating biodiesel from liquid waste such as Brown Grease.

Massive use of fossil fuels has led to an increase in the $CO_2$ concentration in the atmosphere, and this has caused global climate changes. In contradistinction, biofuels which are produced from plant sources, and in particular biodiesel, do not affect the greenhouse gas balance.

Recently, biodiesel has become one of the most potential renewable energy sources. The use of biodiesel instead of conventional diesel fuel can reduce emissions of greenhouse gases and other environmental pollutants (ash, soot, sulfates), protect the environment and improve air quality.

Herein throughout, and in the art, the term "biodiesel" describes a fuel that is made from natural elements such as lipids and fats that originate from plants, vegetables, and/or animals, and/or from re-usable materials such as liquid waste. Biodiesel is typically biodegradable, renewable and non-toxic, and is devoid of petroleum or petrodiesel.

The renewable and biodegradable biodiesel is typically produced by transesterification of vegetable oils and animal fats. The process duration and reaction conditions depend on catalysts, yet currently practiced processes typically require heating and pressure.

Conventional sources of biodiesel are agricultural crops, such as corn, soybean, canola, cotton, mustard and palm. However, use of these crops for biodiesel leads to depletion of global food resources.

Brown grease (BG) is the fat layer of liquid waste generated during cooking and processing of food, which typically included in wastewater from industrial kitchens, food processing facilities, banquet halls, restaurants etc.). Direct disposal of fats, oils and grease (FOG) to sewage collection system (SCS) is illegal. Lipids may precipitate on the walls of pipes in SCS, leading to pipe fouling, clogging, and sewer overflows (He et al., 2011). Removal of BG is usually carried out using grease traps, which are mechanical devices, in which gravitational separation takes place, when effluents flow with a velocity, allowing to float or precipitate the wastes. The fat content in the waste traps depends on the type of industry and can reach up to 15% vol. (Suto et al., 2006; Gabel et al., 2009).

One option for BG treating is anaerobic digestion of fats with methane gas formation (Long et al., 2012; Wang et al., 2012). Another option is to use FOG energy more directly by separating the lipids and converting them into biodiesel, an alternative renewable fuel source (Chakrabarti et al., 2008). The cost of raw materials is very low and even negative, since collection and disposal of wastes is refunded. Thus, even with additional processing costs, FOG can provide a cost-effective alternative to fossil fuels, in addition to minimizing the negative effects of FOG on wastewater treatment systems (Chakrabarti et al., 2008).

Biodiesel can be produced by the chemical reaction of triglycerides or free fatty acids (FFA) with an alcohol (usually, methanol), to form alkyl esters of fatty acids, as a result of trans-esterification reaction in the case of triglycerides, as depicted in Scheme 1 below, and of an esterification reaction in the case of FFA, as depicted in Scheme 2 below.

Scheme 1

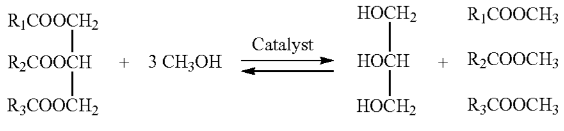

Triglyceride Glycerol Methyl esters (Biodiesel)

Scheme 2

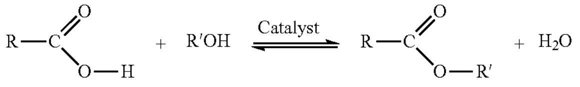

FFA Methyl ester

Both reactions require the use of various catalysts, typically traditional alkaline catalysts such as KOH, NaOH, $NaOCH_3$, $KOCH_3$ and others.

The basic (alkaline) catalysts have a number of advantages, such as the ability to promote the reaction at moderate temperature and atmospheric pressure conditions, high conversion in a relatively short time and a low catalyst cost (Talha & Sulaiman, 2016, Canakci & Gerpen, 2001). However, there is a high sensitivity of the process to even negligible amounts of water and to the presence of FFA in the feedstock. FFA reacts with an alkaline catalyst to form soap (fatty acid salt) and water. As a result, the consumption of the catalyst increases, and the emulsion formed due to the presence of the soap makes it difficult to separate the biodiesel from the glycerin formed by trans-esterification of triglycerides (Talha & Sulaiman 2016, Canakci & Gerpen 2001). The high FFA content in BG therefore restricts the use of alkaline catalysts when producing biodiesel therefrom (Talha & Sulaiman 2016).

Acid catalysis, which is usually carried out with sulfuric acid, is not sensitive to the presence of free fatty acids and trace amounts of water, but this method is less efficient due to a slow reaction rate (Talha & Sulaiman 2016). Thus, acid-catalyzed reactions require higher temperatures, large amounts of catalysts and a longer reaction time in order to achieve the same conversion rates as with basic catalysis (Lam et al., 2010).

One solution to the above-described limitations is the use of a two-phase process in which the first phase is the conversion of FFA to methyl esters with an acid catalyst, and the second phase is basic/alkaline transesterification (Canakci & Gerpen 2001, Banerjee & Chakraborty 2009, Chai et al., 2014) of triglycerides. However, such a process involves increased costs of designing and operating the infrastructure.

Another trend in the development of catalysts for the esterification and transesterification is the use of heterogeneous catalysts (basic or acidic), which facilitate the separation and purification of the product (Romero et al., 2011). Heterogeneous catalysts can also be re-used and allow performing a continuous process. As in the case of homogeneous catalysts, the activity of the alkaline heterogeneous catalysts is higher than that of the acid catalysts, and the reaction proceeds under more moderate conditions, but the limitations posed by the presence of water and FFA still render such processes inefficient (Talha & Sulaiman 2016).

FFA esterification can also be performed in the presence of Lewis acid catalysts (Santos et al., 1996). These catalysts can be used homogeneously (Santos et al., 1996) and heterogeneously (as a solid phase) (Barbosa et al. 2006; Casas et al. 2013), and allow performing the reactions under mild conditions (Sun et al., 2006).

Esterification and transesterification reactions are typically activated thermally, by heating the mixture of reactants and the catalyst at elevated temperatures (Meher et al., 2006).

Recently, it has been reported that esterification reactions can be activated by the use of ultrasound, without application of heat and at high rate and yield (Teixeira et al., 2009; Hingu et al., 2010). These reactions were carried out using basic catalysts: $NaOCH_3$, $KOCH_3$ (Cintas et al., 2010), KOH (Hingu et al., 2010, Rajkovic et al., 2013, Encinar et al., 2012) or SrO (Salamatinia et al., 2012), which are not suitable for esterification of FFA-rich substances such as BG.

Heterogeneous catalysts ($K_3PO_4$, $Na_3PO_4$, $Na_2HPO_4$, $NaH_2PO_4$, $KH_2PO_4$) were investigated with ultrasonic activation, and were shown to be effective for transesterification of used cooking oil, which also has a very law FFA content (Pukale et al., 2015).

SUMMARY OF THE INVENTION

The present inventors have designed and successfully practiced processes and systems for executing thereof which can be utilized for processing liquid waste such as Brown Grease by esterification of free fatty acids (FFAs) optionally together with transesterification of triglycerides using a Lewis acid for promoting the reaction (e.g., $BF_3$, $AlF_3$ and others). The newly designed process utilize ultrasound for activating the chemical reactions and can be used to produce biodiesel at ambient temperatures during several minutes with high efficiency and without additional heating. The newly designed process can be performed in a continuous regime, using solid or gaseous Lewis acid, and/or while recycling the Lewis acid.

According to an aspect of some embodiments of the present invention there is provided a process of generating an alkyl ester of a fatty acid from a free fatty acid-containing substance, the process comprising: contacting a mixture of the free fatty acid-containing substance and a respective alcohol with a Lewis Acid; and during the contacting, exposing the mixture and the Lewis acid to ultrasound energy.

According to some of any of the embodiments described herein, the free fatty acid-containing substance comprises a free fatty acid in an amount of at least 50% by weight.

According to some of any of the embodiments described herein, the free fatty acid-containing substance further comprises a triglyceride, the process being further of generating alkyl esters of one or more fatty acids corresponding to the triglyceride.

According to some of any of the embodiments described herein, the free fatty acid-containing substance is or is derived from a liquid waste.

According to some of any of the embodiments described herein, the free fatty acid-containing substance is or is derived from a Brown Grease.

According to some of any of the embodiments described herein, the mixture is devoid of an alkaline substance.

According to some of any of the embodiments described herein, the mixture is devoid of NaOH.

According to some of any of the embodiments described herein, the mixture comprises water.

According to some of any of the embodiments described herein, the mixture further comprises an organic solvent.

According to some of any of the embodiments described herein, the alcohol and/or the free fatty acid-containing substance is/are immiscible with the organic solvent.

According to some of any of the embodiments described herein, the alkyl ester of the fatty acid is dissolvable or miscible in the organic solvent.

According to some of any of the embodiments described herein, the organic solvent is an aprotic solvent.

According to some of any of the embodiments described herein, an amount of the organic solvent ranges from 5:1 to 1:5, relative to an amount of the alcohol.

According to some of any of the embodiments described herein, an amount of the Lewis acid is in a range of from 0.1 to 10%, or from 1 to 10% by weight, of the total amount of the mixture and of the Lewis acid.

According to some of any of the embodiments described herein, the exposing is for a time period that ranges from 1 to 30 minutes, or from 1 to 20 minutes, or from 1 to 15 minutes, or from 1 to 10 minutes.

According to some of any of the embodiments described herein, the contacting and/or the exposing is/are performed at an ambient temperature.

According to some of any of the embodiments described herein, the Lewis acid is in a solid form.

According to some of any of the embodiments described herein, the Lewis acid is in a gaseous form.

According to some of any of the embodiments described herein, the contacting is performed in a continuous manner.

According to some of any of the embodiments described herein, the Lewis acid is in a non-dispersible solid form, and the contacting comprises continuously introducing the mixture into a reactor comprising the Lewis acid in the non-dispersible solid form.

According to some of any of the embodiments described herein, the reactor is in acoustic communication with an ultrasound transducer.

According to some of any of the embodiments described herein, the Lewis acid is in a gaseous form, and wherein the mixture and the Lewis acid (e.g., in a gaseous form dissolved in the mixture) are introduced to a reactor that is in acoustic communication with an ultrasound transducer, and wherein following the exposing, a liquid phase comprising the alkyl ester of the fatty acid is separated from a gaseous phase comprising the Lewis acid in a gaseous form, and the gaseous form of the Lewis acid is condensed into the liquid form and is re-contacted with the mixture.

According to an aspect of some embodiments of the present invention there is provided an alkyl ester of a fatty acid obtained or obtainable by the process as described herein in any of the respective embodiments and any combination thereof.

According to some of any of the embodiments described herein, the alkyl ester of the fatty acid is being devoid of an alkaline substance or of cations derived from the alkaline substance.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 1B:
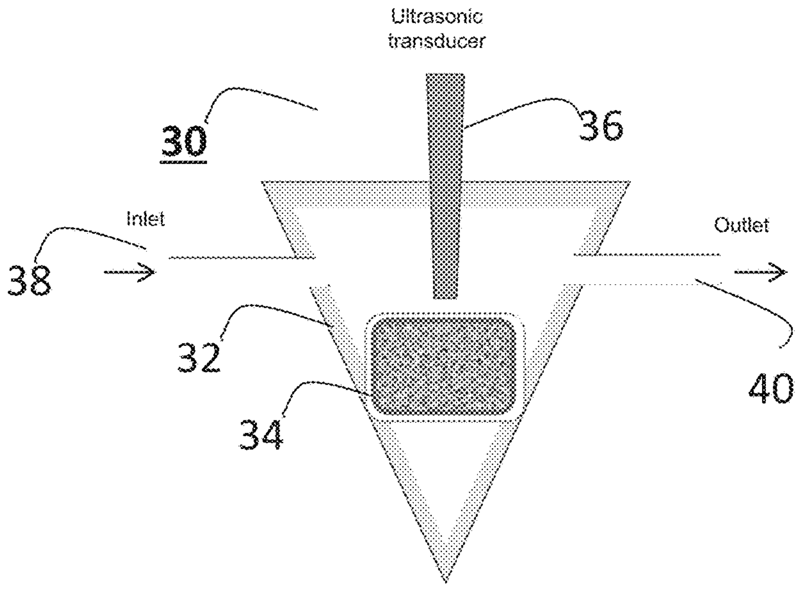

In the drawings:

FIGS. 1A-B present exemplary configurations of a reactor for performing a continuous process according to some of the present embodiments, using a non-dispersible solid form of the Lewis acid.

Figure 2:
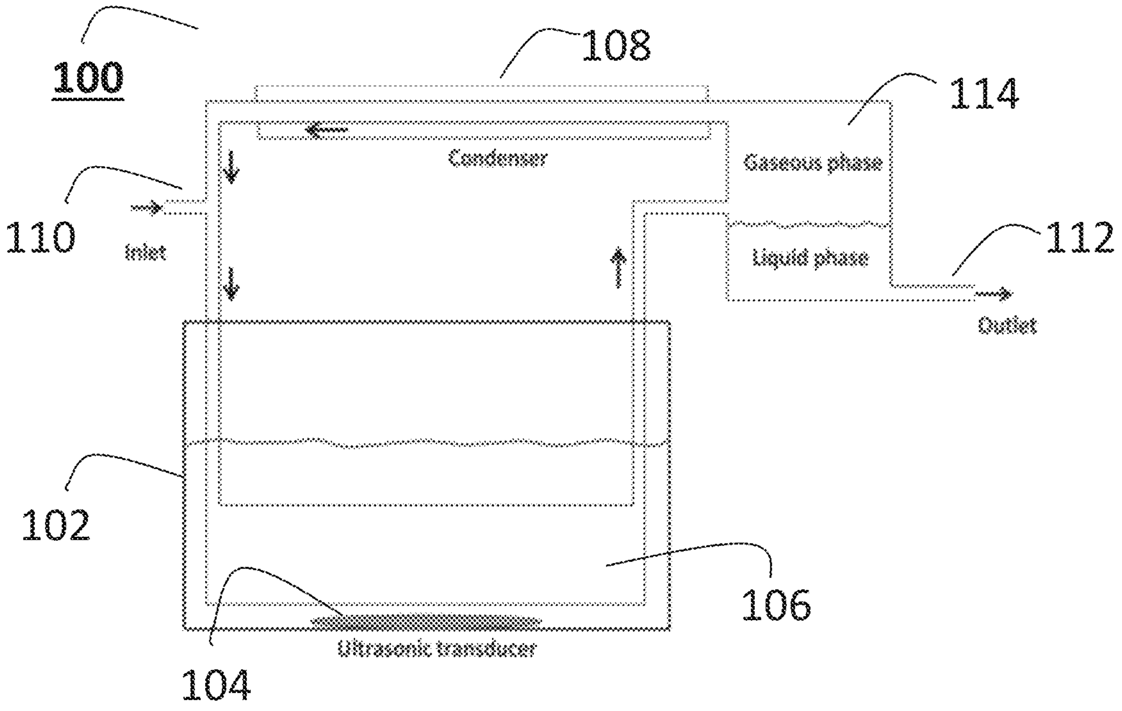

FIG. 2 presents an exemplary configuration of a reactor for performing a continuous process according to some of the present embodiments, using a Lewis acid in a gaseous form, while recycling the Lewis acid.

Figure 3A:
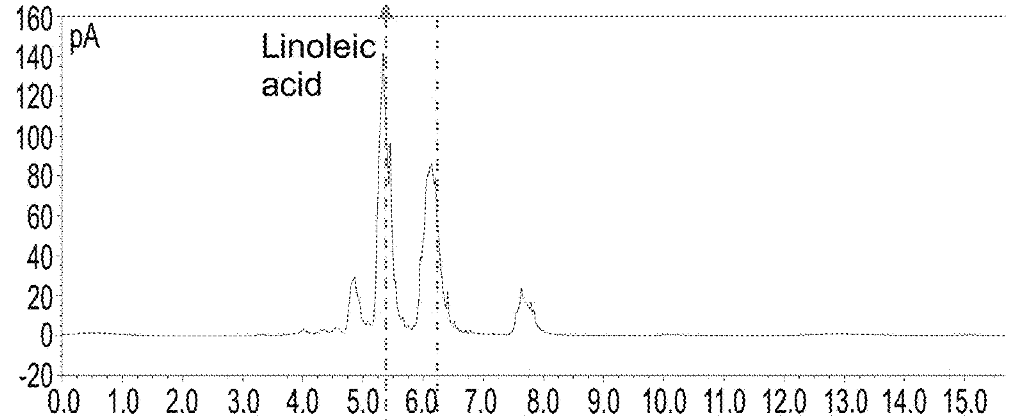
Figure 3B:
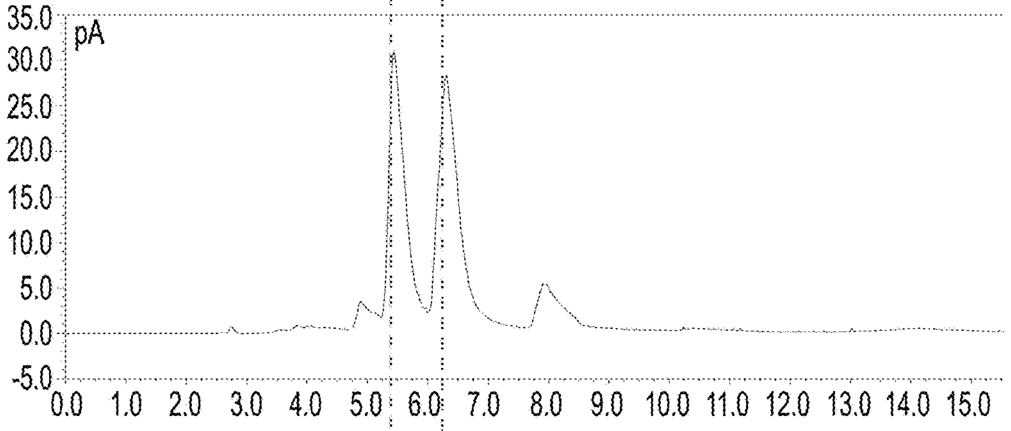
Figure 3C:
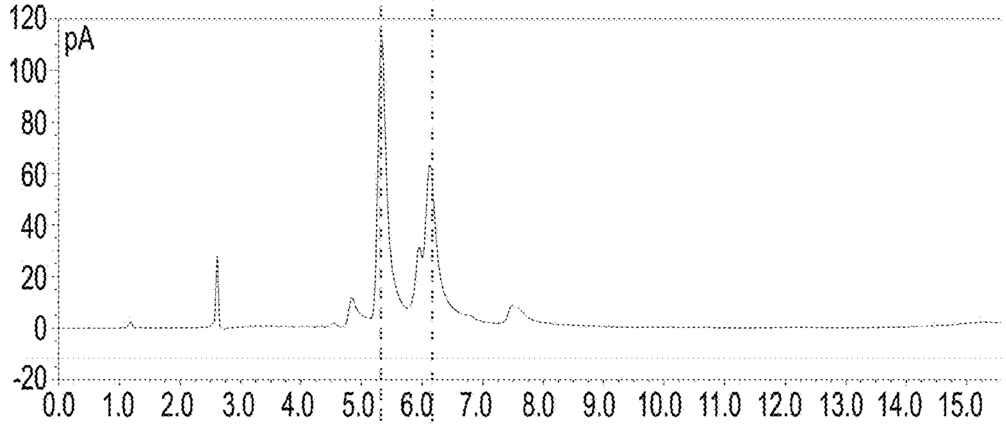
Figure 3D:
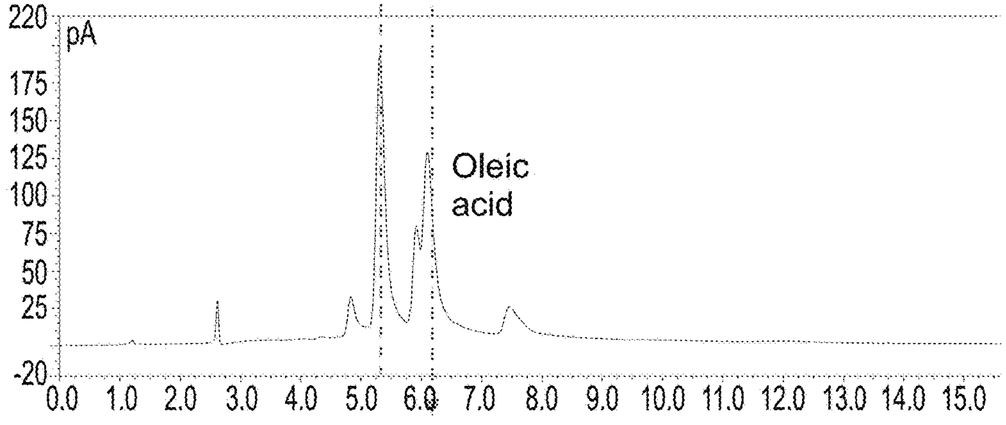

FIGS. 3A-D present the chromatograms obtained for the brown grease oily phase collected from a cafeteria (FIG. 3A), poultry slaughter house (FIG. 3B), and two event halls (FIGS. 3C and 3D).

Figure 4:
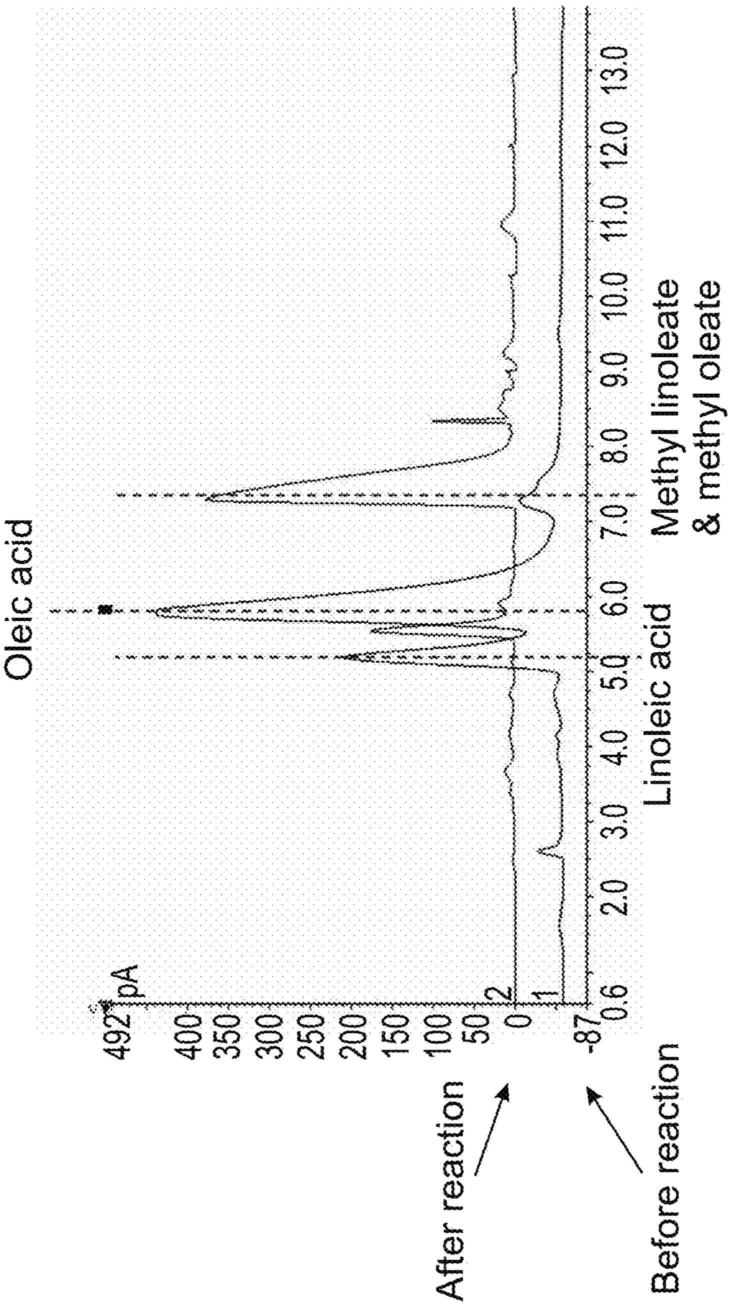
Figures 5A, 5B, 5C, 5D:
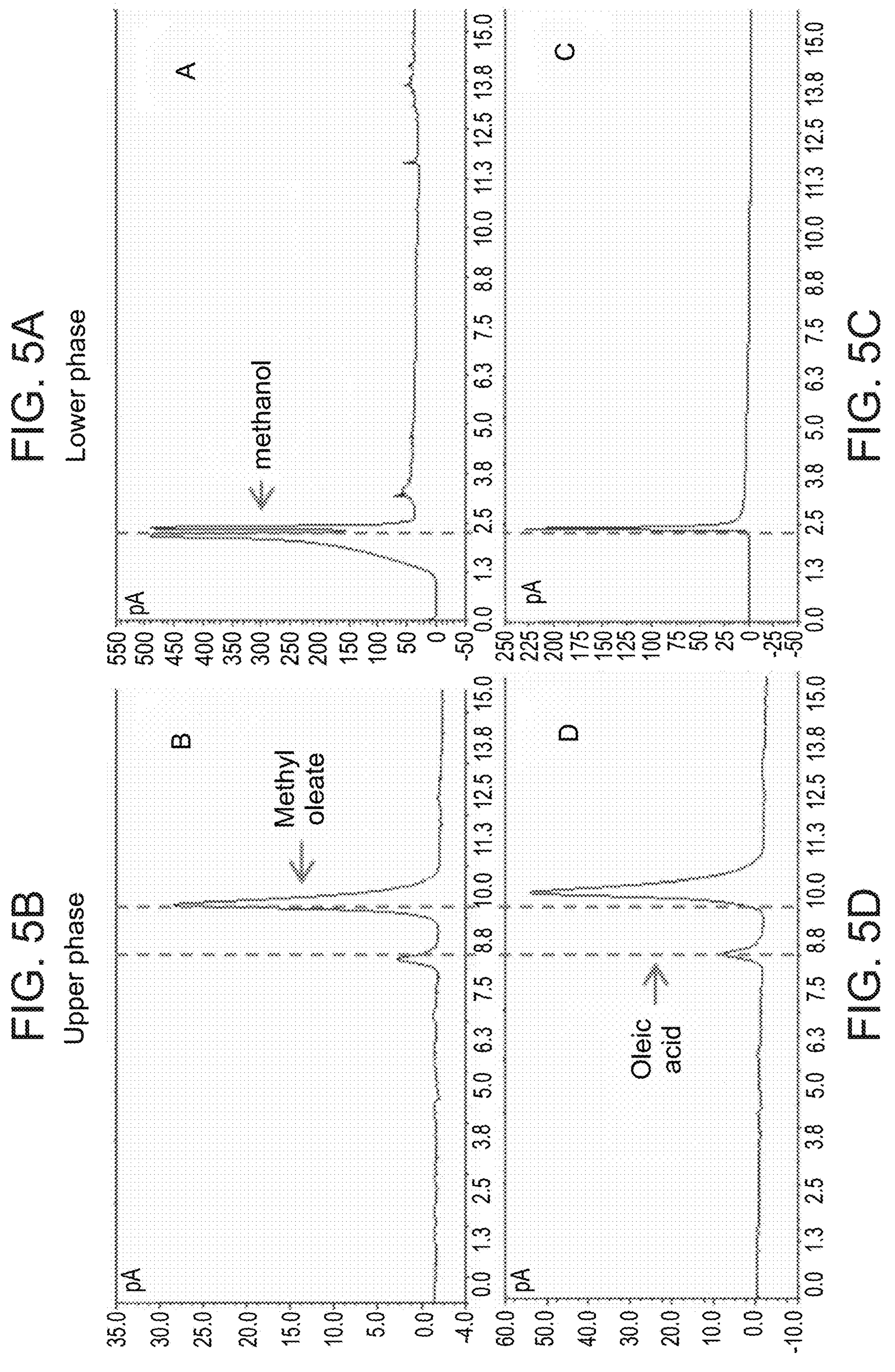

FIG. 4 presents HPLC chromatograms of a mixture of oleic acid and linoleic acid (reference standards), methanol, $BF_3$-MeOH, NaOH and n-Hexane, before and after heating the reaction mixture at 70° C. for 10-15 minutes.

FIGS. 5A-D present comparative HPLC chromatograms of the lower phase with (FIG. 5A) and without (FIG. 5C) NaOH, and of the upper phase with (FIG. 5B) and without (FIG. 5D) NaOH.

Figures 6A, 6B, 6C:
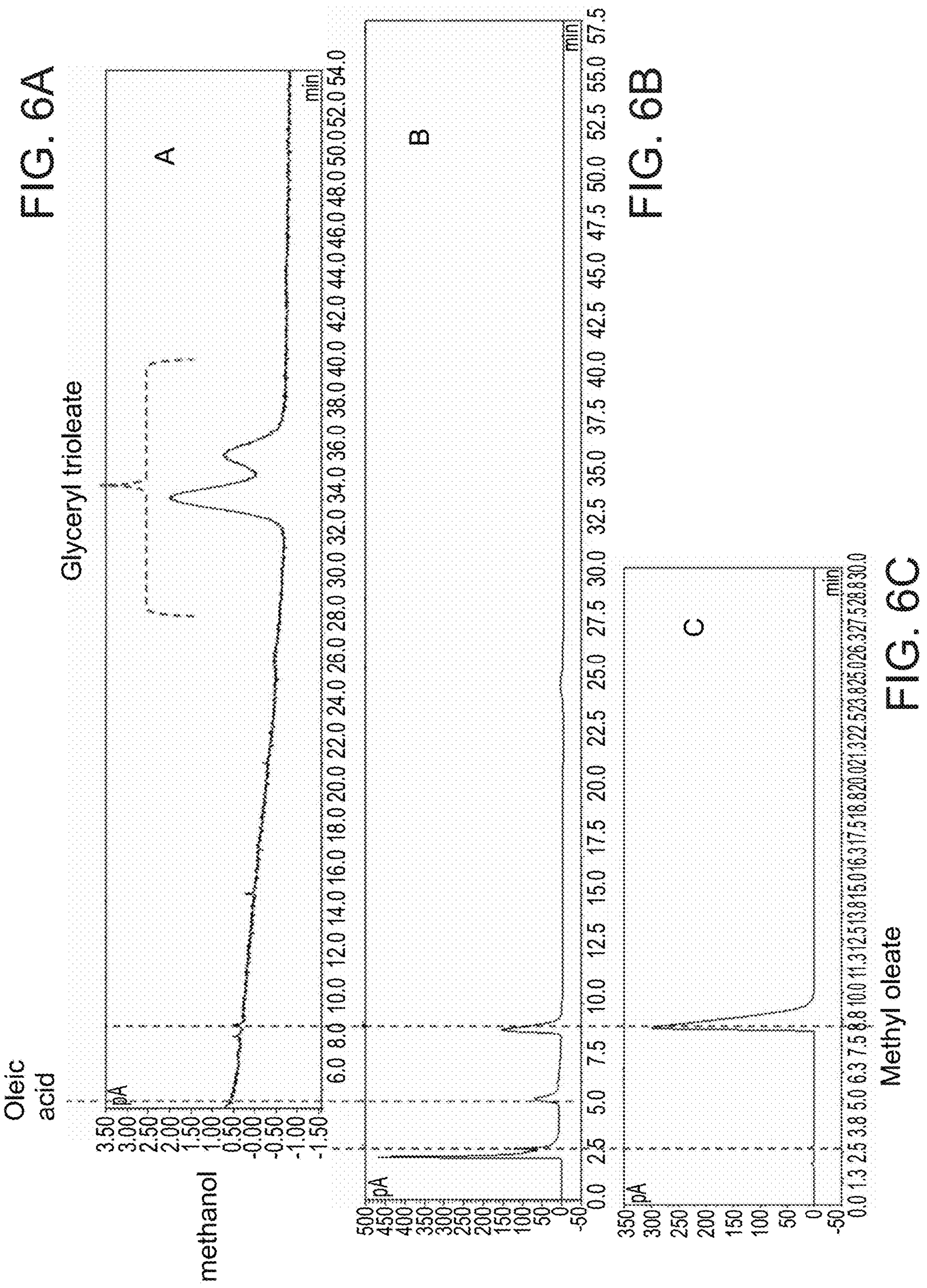

FIGS. 6A-C present chromatograms of GTO (FIG. 6A), of the mixture obtained after the trans-esterification reaction (FIG. 6B) and of a commercially available methyl ester of GTO (FIG. 6C).

Figure 7:
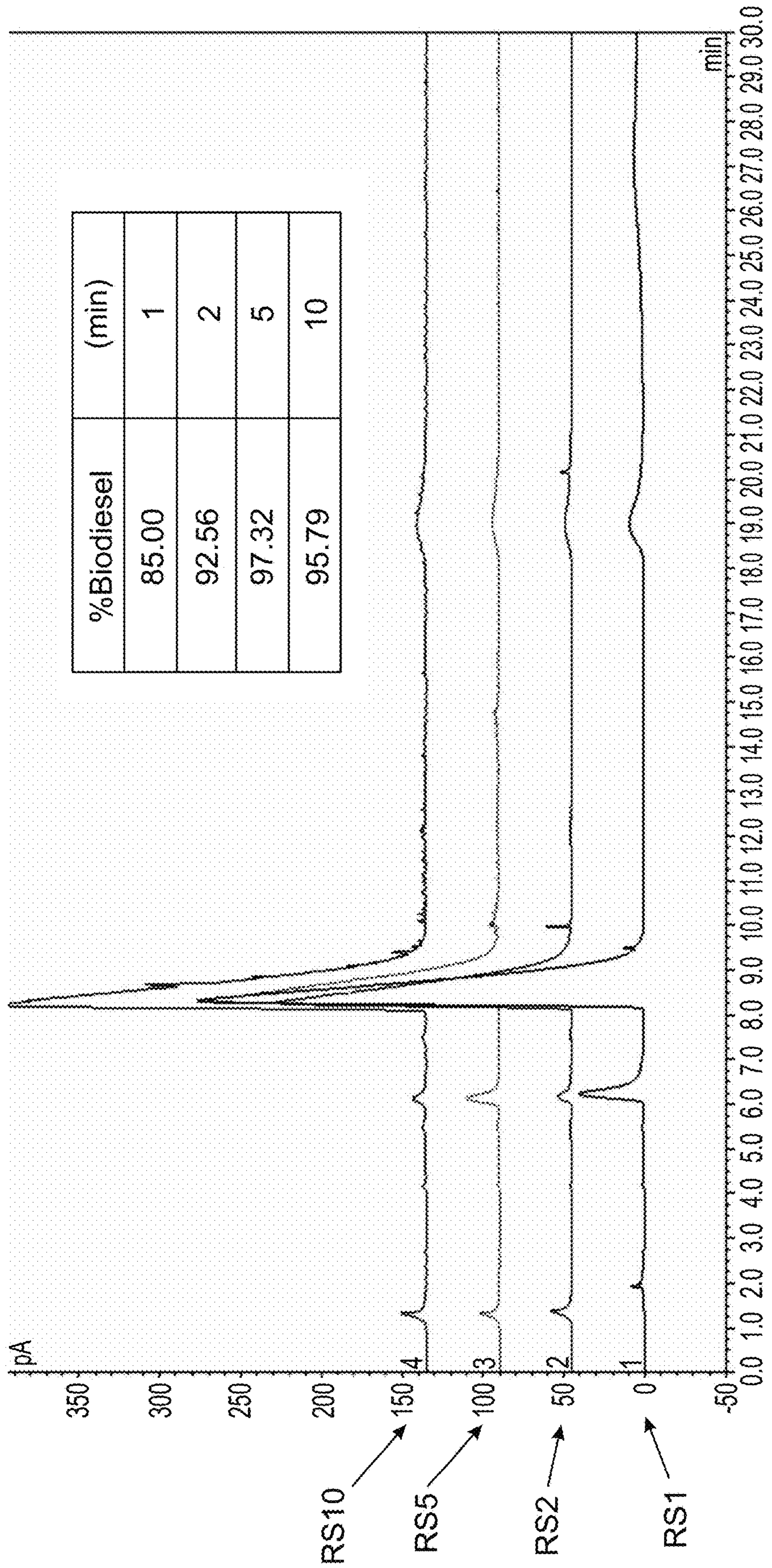

FIG. 7 presents HPLC chromatograms of reactions mixtures containing oleic acid, $BF_3$ in MeOH, methanol and n-Hexane, after sonication by a Sonicator ultrasonic processor (QSUNICA, USA), with a frequency of 20 kHz or ultrasonic bath WUG-AO2H (Wise Clean Company, Korea) with a frequency of 28 kHz, for different time periods (RS).

Figure 8:
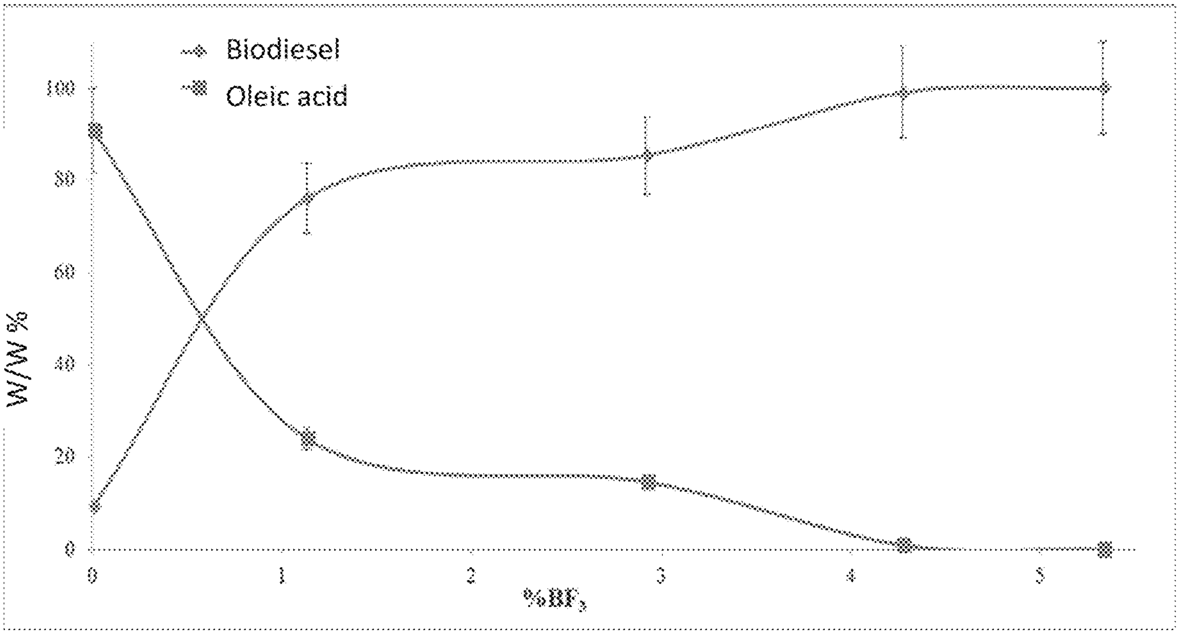

FIG. 8 HPLC chromatograms of reactions mixtures containing oleic acid, methanol and n-Hexane, with different concentrations of $BF_3$ in MeOH, after exposure to sonication.

Figure 9:
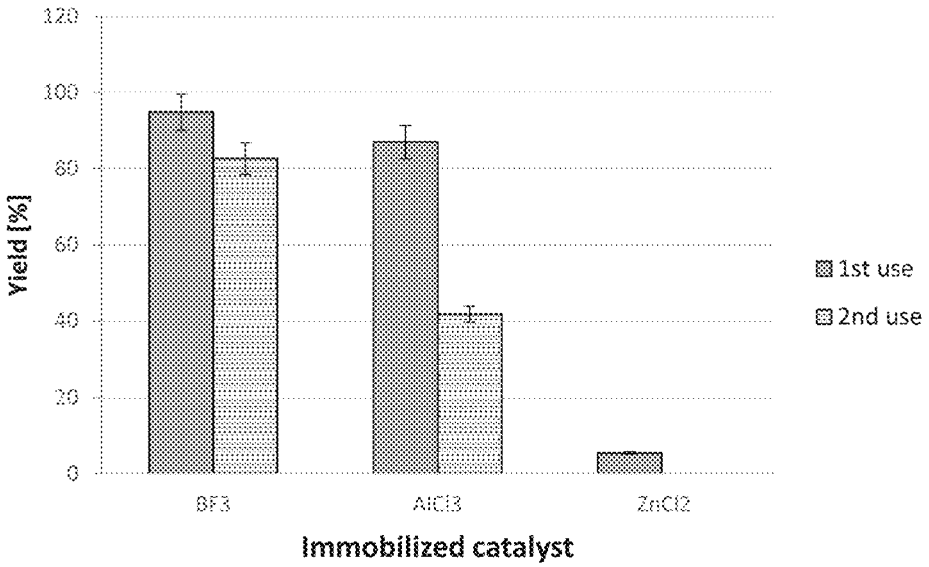

FIG. 9 is a bar graph showing esterification of oleic acid on the presence of $BF_3$, $AlCl_3$ or $ZnCl_2$, immobilized in a sol-gel matrix, upon 15 minutes sonication at room temperature (solid bars), and upon recycling (dashed bars).

DESCRIPTION OF SPECIFIC EMBODIMENTS OF THE INVENTION

The present invention, in some embodiments thereof, relates to biodiesel production and, more particularly, but not exclusively, to a novel process for producing biodiesel from oily substances, such as substances that contain free fatty acid(s). In some embodiments, the process is usable for generating biodiesel from liquid waste such as Brown Grease.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have designed and successfully practiced an improved process of esterification of free fatty acids, which can be used efficiently in production of biodiesel from, for example, liquid waste, and, importantly, in the production of biodiesel from free fatty acid-containing substances such as, for example, Brown Grease. The disclosed process can advantageously replace fossil energy sources by renewable biofuels, decrease greenhouse gas exhausts and contribute to wastewater treatment.

As discussed in the Background section hereinabove, fats-containing liquid wastes generated by the food industry and which are known as Brown Grease (BG), are accumulated in grease traps of e.g., restaurants and food plants. BG is classified as waste, and it must be properly treated and disposed. On the other hand, BG contains vegetable oils and animal fats, which can be converted into biodiesel. All these factors make BG an attractive raw material for biodiesel production.

However, the content of water, detergents and other pollutants, as well as a high content of free fatty acids in BG, does not allow the use of BG in conventional biodiesel production processes. In Example 1 and Table 1 and FIGS. 3A-D referred to therein, the high content of free fatty acids in BG collected from various sources has been demonstrated by the present inventors.

As discussed in the Background section hereinabove, while BG can serve as promising feedstocks for biodiesel production using reactions of esterification and transesterification, it cannot be processed in the presence of conventional basic catalysts due to adverse saponification reactions. In addition, basic catalysts are sensitive to even negligible presence of water (which is typically present in BG). Although conventional acid catalysts do not lead to saponification and are less sensitive to the presence of water, the reaction rates are very low and the process requires high temperatures.

The present inventors have recognized the benefits of using Brown Grease (BG), which has a high free fatty acid (FAA) content, for producing biodiesel, yet, have further recognized that while the esterification and triglyceride trans-esterification of BG can be performed under thermal activation and classical homogeneous catalysis, such processes cannot be practiced efficiently, and are time, cost and energy consuming.

In a search for an improved process for biodiesel production from liquid waste such as BG, the present inventors have uncovered that esterification of free fatty acids (FFAs) can be performed using a Lewis acid for promoting the reaction (e.g., $BF_3$, $AlF_3$ and others), that such Lewis acids can be used also for transesterification of triglycerides and that these reactions can be activated efficiently by means of ultrasound. The newly designed process can be used to produce biodiesel at ambient temperatures during several minutes with high efficiency and without additional heating.

The newly designed process can be performed in a continuous regime, using solid or gaseous Lewis acid, and/or while recycling the Lewis acid.

As demonstrated in the Examples section that follows, and is shown in FIGS. 5A-8, esterification of free fatty acids and transesterification of triglycerides can be efficiently performed in the presence of a Lewis acid, without addition of NaOH, and while using ultrasonic activation, at ambient temperature in several minutes.

For example, under such conditions, esterification of the oleic acid yielded 85% of conversion after only one minute of the reaction and 97% after 5 minutes, thus demonstrating a fast and efficient process of biodiesel production from FFA-rich feedstocks at ambient conditions.

Esterification of oleic acid using Lewis acid catalysts immobilized in a sol-gel matrix, and recycling of the immobilized catalyst, was also successfully demonstrated, as shown in FIG. 9.

Embodiments of the present invention relate to a novel process of generating or producing an alkyl ester of a fatty acid (biodiesel) from a free fatty acid-containing substance such as brown grease, which supersedes currently practiced methodologies for biodiesel production, and to a biodiesel obtainable by this process.

The process of the present embodiments can be advantageously employed in the production of fatty acid alkyl esters (biodiesel), by being characterized by high conversion rate, high yield, high efficiency, ease of use (e.g., at ambient conditions), using heterogeneous catalysis which allows a continuous process, and is cost effective.

According to an aspect of some embodiments of the present invention there is provided a process of generating an alkyl ester of a fatty acid from a free fatty acid-containing substance.

Herein and in the art, the phrase "an alkyl ester of a fatty acid" describes a compound, or a mixture of compounds, which are each independently represented by the Formula I:

Formula I $$R{-}C({=}O){-}OR'$$

wherein R is a saturated or unsaturated alkylene chain of at least 6 carbon atoms in length, and R' is an alkyl of from 1 to 10 carbon atoms in length.

In some embodiments, R' is an unsubstituted alkyl.

In some embodiments, R' is an alkyl of from 1 to 8, or from 1 to 6, or from 1 to 4 carbon atoms.

In some embodiments, R' is methyl or ethyl.

In some of any of the embodiments described herein, an alkyl ester of a fatty acid is such that the alkyl is as defined herein for R' in Formula I, in any of the respective embodiments and any combination thereof.

In some of any of the embodiments described herein, R is an alkylene chain of a free fatty acid that is represented by Formula II:

Formula II $$R{-}C({=}O){-}OH$$

With R being as defined for Formula I.

Alternatively, R can be an alkylene chain of a triglyceride that is represented by Formula III:

Formula III

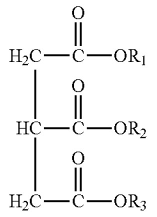

in which each of $R_1$, $R_2$ and $R_3$ is independently as defined herein for R.

When the alkyl ester is of a triglyceride as represented by Formula III, one, two or each of $R_1$, $R_2$ and $R_3$ is replaced by R' as defined herein (by trans-esterification).

Representative examples of fatty acids according to the present embodiments include, without limitation, saturated or unsaturated fatty acids that have 8 or more carbon atoms, preferably 10 or more carbon atoms, for example, 12-14 carbon atoms, such as, but not limited to, lauric acid, sebacic acid, myristic acid, lauric acid, palmitic acid, stearic acid, oleic acid, linoleic acid, linolenic acid, arachidonic acid, palmitoleic acid, erucic acid, etc. The variable "R" in Formula I, II or III can be an alkylene chain of the above-mentioned fatty acid.

Herein, the phrase "free fatty acid-containing substance" encompasses a compound which is a free fatty acid (e.g., have a Formula II as described herein), or a mixture of two or more different free fatty acids, as defined herein, and any substance which contains a free fatty acid or a mixture of free fatty acids, and optionally other components, including other fatty (oily) components such as, for example, a triglyceride (e.g., having a Formula III as defined herein), or a mixture of two or more triglycerides, liquid components, solid components, aqueous solutions, water, etc.

The process as described herein can therefore be utilized for the esterification of free fatty acids when present per se or when forming a part of a mixture of various materials and/or substances.

In some embodiments, the process as described herein is utilized for producing biodiesel as defined herein and in the art, by means of, inter alia, esterification of free fatty acids. The process of producing biodiesel can further include generation of alkyl esters of fatty acids by other reactions, for example, by trans-esterification of triglycerides.

In some embodiments, the free fatty acid-containing substance is a waste material and the process as described herein is utilized for producing biodiesel from the waste material. In some embodiments, the process is utilized for producing biodiesel from a waste material by, inter alia, esterification of free fatty acids, and optionally also by transesterification of triglycerides if such are present in the waste material.

In some of these embodiments, the waste material is a liquid waste material, that is, a waste material that comprises a liquid substance (comprising one or more liquid components) and optionally also a solid substance (comprising one or more solid components).

A liquid waste material typically comprises oils and optionally further comprises other organic components, water and/or other aqueous components.

In some embodiments, the free fatty acid-containing substance is a liquid waste. In some embodiments, the free fatty acid-containing substance is or comprises an oily or organic phase of a liquid waste. In some of these embodiments, a waste material that comprises a liquid waste is used as is in the process as the fatty acid-containing substance. Alternatively, the waste material is first processed so as to remove solid components (e.g., by filtration) and optionally non-organic (e.g., water and water-soluble components) or non-fat liquid components (e.g., by extraction or by a simple phase separation), and the processed material which comprises only liquid components of the waste material or only fatty substances of the waste material is used as a free fatty acid-containing substance.

In some embodiments, the process comprises processing a waste material so as to remove solid components, if present, and optionally non-organic or non-fat liquid components, if present, as described herein, and using the thus processed waste material as the free fatty acid-containing substance (e.g., as a feedstock).

In some of any of the embodiments described herein, the waste material is Brown Grease (BG), as described herein. The brown grease can be used as is (e.g., upon being collected from an oil trap), or upon being processed to remove solid components, if present, and optionally non-organic or non-fat liquid components, if present.

Herein throughout, the free fatty acid-containing substance is or forms a part of a feedstock, from which a biodiesel is obtained by the process as described herein.

The process of the present embodiments, for preparing an alkyl ester of a fatty acid, can be regarded as a process of preparing or producing biodiesel from a free fatty acid-containing substance, as defined herein.

The process of the present embodiments, for preparing an alkyl ester of a fatty acid, can be regarded as a process of an esterification of a free fatty acid in a fatty acid-containing substance, as defined herein.

According to some of any of the embodiments described herein, the fatty acid-containing substance comprises one or more free fatty acids and one or more triglycerides.

According to some of any of the embodiments described herein, the fatty acid-containing substance comprises one or more free fatty acids in an amount of at least 20, or at least 30, or at least 40, preferably of at least 50, or at least 60, or at least 70, or at least 80% by weight of the total weight of the free fatty acid-containing substance (the feedstock).

According to some of any of the embodiments described herein, the fatty acid-containing substance comprises one or more free fatty acids in an amount of 20, 30, 40, 50, 60, 70, 80, 90, or 100% by weight, including any intermediate values and subranges between these values of the total weight of the free fatty acid-containing substance (the feedstock).

In some of any of the embodiments described herein, the free fatty acid-containing substance comprises one or more of oleic acid and linoleic acid. In some of these embodiments, a total concentration of these one or more free fatty acids in the feedstock is at least 50%, or at least 60%, or at least 70%, and in some embodiments, the total amount ranges from 30 to 100%, or from 40 to 100%, or from 50 to 100%, or from 60 to 100%, or from 50 to 90%, or from 60 to 90%, or from 50 to 80%, or from 60 to 80%, or from 60 to 70%, or from 70 to 80%, by weight, of the total weight of the feedstock, including any intermediate values and subranges therebetween.

In some of any of the embodiments described herein, the free fatty acid-containing substance (e.g., the feedstock) comprises water. In some of these embodiments, the amount of water is at least 0.1%, or at least 0.5%, or at least 1%, and can be even higher, e.g., at least 5%, at least 10% or higher. In case of feedstock that is unprocessed waste material, the amount of water can be of 20%, 50%, 80% or higher.

According to the present embodiments, a process as described herein comprises contacting a mixture of the free fatty acid-containing substance, as described herein in any of the respective embodiments, and a respective alcohol (also referred to herein as a mixture of reagents, as a reagents mixture or simply as a mixture) with a catalytic amount of a Lewis Acid.

By "respective alcohol" it is meant a R'OH compound from which R' in Formula I is derived (see, for example, Scheme 2 above). In some embodiments, R' is a short alkyl, of, for example, 1 to 6, 1 to 5, or 1 to 4, carbon atoms in length. In exemplary embodiments, the alcohol is a short alcohol, for example, methyl, ethyl, n-propyl or n-butyl, alcohol (namely, methanol, ethanol, n-propanol, n-butanol, respectively), however, other alcohols, in which R' is, for example, a branched and/or substituted alkyl, and/or is an alkyl of more than 4 carbon atoms in length) are also contemplated. In an exemplary embodiment, the alcohol is methanol and the alkyl ester of the fatty acid is a methyl ester. In an exemplary embodiment, the alcohol is ethanol and the alkyl ester of the fatty acid is an ethyl ester.

By "Lewis acid" it is meant, as commonly accepted in the art, a compound or species with is an acceptor of a pair of electrons.

An amount of the Lewis acid is selected so as to promote the reaction(s) and reduce their duration, and can be determined by those skilled in the art by known means.

In some embodiments, the Lewis acid is used in an amount which is no more than 10 mol % relative to the total amount of a mixture of the free fatty acid in the free fatty acid-containing substance, the respective alcohol and the Lewis acid (e.g., a total amount of the reagents mixture and the Lewis acid).

Exemplary Lewis acids that are usable in the context of the present embodiments are based on metals such as aluminum, boron, silicon, tin, titanium, zirconium, iron, copper, and zinc, which are typically substituted by one or more electron withdrawing groups, most commonly one or more halo atoms (e.g., fluoro, chloro, or bromo). Exemplary Lewis acids include $BF_3$, $Al_2Cl_3$, $TiCl_4$, $ZnCl_2$, $BCl_3$, and more complex Lewis acids, including any other Lewis acid known in the art as promoting esterification or transesterification of fatty acids and/or triglycerides. Such Lewis acids are also referred to herein and in the art as Lewis acid catalysts or simply as catalysts.

In exemplary embodiments, the Lewis acid is $BF_3$.

According to the present embodiments, the process further comprises sonication of the reaction mixture, that is, subjecting the mixture of the free fatty acid-containing substance and the respective alcohol, and optionally an organic solvent, when contacted with the Lewis acid, to sonication.

By "sonication" it is meant application of a sound energy. In some embodiments the sonication comprises application of ultrasound energy, or ultrasonication, at frequencies of, for example, higher than 20 kHz, for example, of from 20 kHz to 100 kHz, or from 20 kHz to 80 kHz, including any intermediate values and subranges therebetween. Higher values are also contemplated. In some embodiments, the process is effected by exposing the mixture of reagents, when contacted with the Lewis acid, to ultrasound energy, as described herein.

In some of any of the embodiments described herein, contacting a mixture of the fatty acid-containing substance, the alcohol and the Lewis acid is for a time period in the range of minutes, that is, for example, from 1 to 30, or from 1 to 20, or from 1 to 15, or from 1 to 10, or from 1 to 8 minutes, including any intermediate value and subranges therebetween.

In some of any of the embodiments described herein, the application of sonication is for a time period in the range of minutes, that is, for example, from 1 to 30, or from 1 to 20, or from 1 to 15, or from 1 to 10, or from 1 to 8 minutes, including any intermediate value and subranges therebetween.

In some of any of the embodiments described herein, the contacting and the sonication are effected substantially at the same time. In some of these embodiments, contacting and sonication are effect substantially at the same time for a time period as indicated herein.

It is to be noted that a time period of the contacting and/or the sonication can be longer than 30 minutes, and may depend, inter alia, on the amount and/or phase of the Lewis acid. For example, in some of the embodiments that relate to a Lewis acid that is dissolved or dispersed in the reaction mixture, or is in a gaseous form, the time period is lower than 20 minutes and can be even lower than 10 minutes. In some of the embodiments that relate to a Lewis acid that is in a non-dispersible solid form, the time period is typically higher than 10 minutes, and can be even higher than 30 minutes. Time periods of the contacting and/or sonication can be manipulated by increasing or reducing the amount of the Lewis acid.

In some of any of the embodiments described herein, the contacting and/or the sonication are performed at an ambient temperature, for example, at room temperature±10° C.

In some of any of the embodiments described herein, the mixture of the fatty acid-containing substance and the respective alcohol is devoid of an alkaline substance, and in some embodiments, it is devoid of an alkaline substance that is usable in esterification and/or transesterification reaction of fatty acids and triglycerides, respectively.

In some of any of the embodiments described herein, the mixture is devoid of NaOH.

In some of any of the embodiments described herein, the mixture is devoid of KOH.

By "devoid of" it is meant that the alkaline substance (e.g., NaOH) is in an amount that does not exceed 0.1%, or 0.05%, or 0.01%, or 0.005%, by weight, of the total weight of the respective mixture or product, or is completely absent therefrom.

In some of any of the embodiments described herein, the mixture of the free fatty acid-containing substance (e.g., the feedstock) and the respective alcohol further comprises an organic solvent, preferably an aprotic and/or hydrophobic organic solvent such as a liquid alkane (e.g., hexane, heptane, octane, and the likes).

In some of any of the embodiments described herein, the organic solvent, when present, is such that is immiscible with the alcohol (R'OH) and/or the free fatty acid and/or the free fatty acid-containing substance as described herein, at least at room temperature and/or without subjecting a mixture of the organic solvent and the reagents mixture to sonication as described herein.

In some of any of the embodiments described herein, the organic solvent is such that the alkyl ester of the fatty acid (the biodiesel) is dissolvable or miscible therewith, at room temperature and without subjecting a mixture of the organic solvent and the reagents mixture to sonication as described herein.

Exemplary such solvents include aprotic, preferably hydrophobic, organic solvents as described hereinabove, for example, an alkane, or a mixture of alkanes, or alkenes, alkynes or a mixture of one or more of an alkane, alkene and alkyne. The organic solvent is preferably non-volatile at room temperature, that is, has a boiling temperature that is higher than 40, or higher than 50, ° C. An exemplary organic solvent is n-hexane. A use of such organic solvents provides for a biphasic system, at least at room temperature and/or when sonication is not applied, in which one phase contains the feedstock, the alcohol and optionally the Lewis acid (if and when dissolved in the reagents mixture), and the other phase contains the organic solvent and the produced biodiesel. Such a system enables efficient separation of the organic solvent that comprises the biodiesel product from the reaction mixture. Such a system further enables "shifting" the reaction's equilibrium towards the biodiesel production, as the formed biodiesel continuously moves from the reaction mixture phase that contains the feedstock and the alcohol to the organic solvent phase.

In some of any of the embodiments described herein in the context of an organic solvent, an amount of the organic solvent ranges from 5:1 to 1:5, or from 1:1 to 1:5, by volume, relative to an amount of the reagents mixture, including any intermediate values and subranges therebetween.

In some of any of the embodiments described herein, the process is performed in a reactor to which the reagents (e.g., the feedstock and the respective alcohol, and optionally an organic solvent) are fed. The reactor preferably further comprises, or is in acoustical communication with, an ultrasound transducer, for generating ultrasound energy in the reactor.

The ultrasound transducer can be in acoustical communication with an ultrasonic bath which in turn is in acoustical communication with a reaction vessel to which the reagents are fed. In such embodiments, the ultrasound transducer forms a part of the reactor. Alternatively, the ultrasound transducer is external to the reactor and is in acoustical communication with the reactor, or with a reaction vessel within the reactor which comprises the reagents, during the process. Other configurations for application of sound energy are also contemplated.

In some of any of the embodiments described herein, the Lewis acid is contacted with the mixture to form a solution. For example, $BF_3$, which is a gas at room temperature, is dissolved in the respective alcohol or a portion thereof, or otherwise in an organic solvent as described herein, and the process is performed as a homogeneous reaction (in terms of the catalyst and the reagents mixture being both in a liquid phase). In another example, $AlCl_3$, which is solid (e.g., powder) at room temperature, is dispersed in the reagents mixture, and the process is performed as a heterogeneous reaction.

In some embodiments, the process is performed in a batch-wise manner. For example, a feedstock and a respective alcohol (herein also referred to as reagents or reagents mixture) and optionally an organic solvent are fed into a reactor as described herein, the Lewis acid (e.g., as a solution or a powder) is added (either before, after or together with introducing the mixture to the reactor) and sonication is applied (e.g., by an ultrasound transducer as described herein). The resulting mixture is then removed from the reactor and a new batch of a feedstock, a respective alcohol and a Lewis acid, and optionally an organic solvent, is added, and so forth.

In some of any of the embodiments described herein, the Lewis acid is in a form that allows performing a heterogeneous catalysis, such that the Lewis acid and the reagents (the fatty acid-containing substance and the respective alcohol and optionally an organic solvent) are in separate phases (e.g., solid and liquid or gaseous and liquid, respectively), during the contacting, such that the Lewis acid is not dissolved or dispersed in the reagents mixture for at least a certain time period during the contacting.

In some of any of the embodiments described herein the Lewis acid is in a solid form, preferably a non-dispersible solid form. Exemplary such Lewis acids include, for example, all Lewis acids that are solid at room temperature, and which are immobilized by being entrapped within a liquid-permeable matrix or by being attached or absorbed onto and/or into a matrix.

A non-limiting exemplary matrix is a porous silica matrix, for example, a matrix prepared by a sol-gel process using an orthoester silicate, in which a solid Lewis acid catalyst is entrapped (immobilized). Any other porous or otherwise liquid-permeable matrices are contemplated.

In some of any of the embodiments described herein, the Lewis acid is in a gaseous form. Exemplary such Lewis acids include, for example, $BF_3$.

In some of any of the embodiments described herein, the contacting is performed in a continuous manner. In some of these embodiments, the mixture of the fatty acid-containing substance and the respective alcohol and optionally an organic solvent, is continuously fed into a reactor that comprises the Lewis acid. In some of these embodiments, the reactor is in acoustical communication with an ultrasound transducer, as described herein.

In some of these embodiments, the Lewis acid is in a solid form, as described herein, and the contacting comprises continuously introducing the mixture of the reagents and optionally an organic solvent into a reactor comprising the Lewis acid in a non-dispersible solid form.

In some of these embodiments, the reactor further comprises, or is in acoustical communication with, an ultrasound transducer that generates ultrasound energy in the reactor, as described herein.

Exemplary such reactors are schematically illustrated in FIGS. 1A-B in a non-limiting way.

FIG. 1A presents a reactor 10, which comprises an ultrasonic bath 12, and an ultrasound transducer 14 configured for generating ultrasonic energy in bath 12. The reactor further comprises a reaction vessel 16 which is positioned in (or is in contact with or is in acoustical communication with) bath 12 and contains a non-dispersible solid form of a Lewis acid 18. Preferably, Lewis acid 18 is in an immobilized form (e.g., entrapped within a porous silica matrix such as, for example, a sol-gel matrix). Preferably, but not limiting, Lewis acid 18 and vessel 16 are configured such that Lewis acid 18 is positioned close to transducer 14. The reactor further comprises an inlet port 20 for introducing the mixture of the fatty acid-containing substance and the respective alcohol to reaction vessel 16, and an outlet 22 from which a mixture containing the alkyl ester product flows out of reactor 10. The mixture of the feedstock and the respective alcohol can be flowed continuously through reaction vessel 16 via inlet 20 and outlet 22 by means of, for example, a pump, or by application of pressure. The flow rate can be controlled so as to achieve high reaction efficiency. Inlet 20 and outlet 22 can include valves for controlling the flow of the reagents mixture through reaction vessel 16. Exemplary flow rates are such that provide a retention time of the reagents mixture in the reactor that correspond to the contacting and/or exposing as described herein in any of the respective embodiments, e.g., 1-30 minutes, or 15-30 minutes). In exemplary embodiments, for a reactor volume of 90 ml, a flow rate of 3-10, or 3-6 ml/minute is practiced.

It is noted that the configuration presented in FIG. 1A is an exemplary illustration and that any other configurations in which a reaction vessel 16 contacts bath 12 and allows contacting the reaction mixture continuously with Lewis acid 18 are contemplated.

FIG. 1B presents another exemplary configuration of a reactor 30 which comprises reaction vessel 32 in which a solid form of the Lewis acid 34 is positioned. Reactor 30 comprises an external ultrasound transducer 36 which, when the process proceeds, is introduced to reaction vessel 32, and preferably, is positioned close to Lewis acid 34. Reactor 30 further comprises inlet 38 and outlet 40 for continuously flowing the mixture through reaction vessel 32 and contacting it with Lewis acid 34. In some embodiments, reaction vessel 32 has a rectangular shape, for the effective distribution of ultrasonic waves. Any other configuration suitable for employing an external US transducer is contemplated.

In some embodiments in which the contacting is performed continuously, the Lewis acid is in a gaseous form, and the contacting comprises continuously introducing to a reactor that is or is capable of being in acoustic communication with an ultrasound transducer, the reagents mixture and a condensed or dissolved liquid form of the gaseous Lewis acid.

FIG. 2 presents an exemplary, non-limiting, configuration of a reactor 100 for performing a continuous process with a gaseous form of a Lewis acid (not shown in FIG. 2).

Reactor 100 comprises an ultrasonic bath 102, and an ultrasound transducer 104 configured for generating ultrasonic energy in bath 102 (being in acoustical communication with bath 102). The reactor further comprises a reaction vessel 106 which is positioned in (or in contact with or in acoustical communication with) bath 102. Reactor 100 further comprises an inlet port 110 for introducing the mixture (not shown) of the fatty acid-containing substance and the respective alcohol to reaction vessel 106, and an outlet 112 from which a mixture containing the alkyl ester product flows out of reactor 100. The mixture of the feedstock and the respective alcohol can be introduced continuously through reaction vessel 106 via inlet 110 and removed via outlet 112 by means of, for example, a pump, or by application of pressure. The flow rate can be controlled so as to achieve high reaction efficiency. Inlet 110 and outlet 112 can include valves for controlling the flow of the reagents mixture through reaction vessel 106. The flow rate can be as described herein for reactor 10.

A gaseous form of the Lewis acid (not shown in FIG. 2) is introduced to the reactor via inlet 110, either before, after or together with introducing the reagents mixture. Reaction vessel 106 further comprises unit 114 which is preferably positioned between bath 102 and outlet 112. Unit 114 is configured such that a liquid phase which comprises a mixture containing the alkyl ester product flows out through outlet 112 and a gaseous form of the Lewis acid is generated and continues flowing within reaction vessel 106. Preferably, unit 114 is configured to effect minor heating and/or reduced pressure for obtaining a separated gaseous form of the Lewis acid, optionally together with excess of the respective alcohol. The formed gaseous phase is then flowed through a condensing unit 108, which is positioned between unit 114 and inlet 110. When the gaseous Lewis acid flows through condensing unit 108, it liquefies and then flows in a liquid form to the portion of reaction vessel 106 that is in contact (as described herein) with bath 102.

It is noted that the configuration presented in FIG. 2 is an exemplary illustration and that any other configurations in which a gaseous form of the Lewis acid continuously contacts the reagents mixture while being exposed to sonication are contemplated.

According to an aspect of some embodiments of the present invention, there is provided an alkyl ester of a fatty acid or a mixture of two or more alkyl esters of fatty acids, as defined herein, or a biodiesel, which is obtained by the process of the present embodiments, that is, as a product of the process. The chemical composition of the obtained alkyl ester is determined by the chemical composition of the feedstock.

In some embodiments, the obtained product is devoid of, as defined herein, an alkaline substance or of cations derived from the alkaline substance, as defined herein. In exemplary embodiments, the product is devoid of NaOH or of sodium salts or of any other cations that form alkaline substances usable in esterification of free fatty acids as described herein and in the art.

In exemplary embodiments, the product is devoid of, as defined herein, one or more, and preferably all of KOH, NaOH, $NaOCH_3$, $KOCH_3$, $K^+$, $Na^+$, NaOR', KOR', with R' being as defined herein, and salts of sodium and/or potassium.

It is expected that during the life of a patent maturing from this application many relevant Lewis acid catalysts, including solid (e.g., immobilized) and gaseous forms of such catalysts will be developed and the scope of the term Lewis acid is intended to include all such new technologies a priori.

It is expected that during the life of a patent maturing from this application many relevant alkaline substances usable for esterification of free fatty acids will be developed and the scope of the term alkaline substance is intended to include all such new technologies a priori.

As used herein the term “about” refers to ±10% or ±5%.

The terms “comprises”, “comprising”, “includes”, “including”, “having” and their conjugates mean “including but not limited to”.

The term “consisting of” means “including and limited to”.

The term “consisting essentially of” means that the composition, method or structure may include additional ingredients, steps and/or parts, but only if the additional ingredients, steps and/or parts do not materially alter the basic and novel characteristics of the claimed composition, method or structure.

As used herein, the singular form “a”, “an” and “the” include plural references unless the context clearly dictates otherwise. For example, the term “a compound” or “at least one compound” may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases “ranging/ranges between” a first indicate number and a second indicate number and “ranging/ranges from” a first indicate number “to” a second indicate number are used herein interchangeably and are meant to include the first and second indicated numbers and all the fractional and integral numerals therebetween.

As used herein the term “method” refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Materials and Experimental Methods

HPLC (UHPLC UltiMate 3000, Dionex, Germany) equipped with a Corona ultra RS (Thermo scientific, Germany) detector, and a PolyRP-100-Sepax (Technologies, Inc., USA) 5 μm, 120 Å, 4.6×250 mm column was used in all measurements unless otherwise indicated. The column temperature was 30° C., the flow rate was 1.2 ml/minute and the injected volume was 2 μl. The HPLC mobile phase consisted of 100% acetonitrile.

All reagents were purchased from known vendors unless otherwise indicated.

Example 1

The chemical composition of the oil phase of brown grease collected from oil traps positioned at various locations was tested using HPLC as described hereinabove, and while using reference standards of oleic acid and linoleic acid.

The oil phase of the collected brown grease was obtained by heating the collected brown grease sample up to 40° C. for 15 minutes, followed by centrifugation for 2 minutes at 1500 rpm.

FIGS. 3A-D and Table 1 below present the chromatograms obtained for the brown grease oily phase collected from a cafeteria (FIG. 3A), poultry slaughter house (FIG. 3B), and two event halls (FIGS. 3C and 3D). As can be seen, the fats composition in all the tested samples was similar. The total amount of the FFA oleic and linoleic acids in the tested samples is 83-88% by weight, while the amount of each of these fatty acids was similar and ranges from 38-47% by weight. It is noted that as opposed to liquid waste, cooking oils typically include triglycerides of these fatty acids in an amount of 70-80%.

TABLE 1

| | Oil phase composition | | |
|---|---|---|---|
| BG source | Oleic acid (wt. %) | Linoleic acid (wt. %) | Other fats (wt. %) |
| Cafeteria | 39.5 | 43.9 | 16.6 |
| Poultry slaughter house | 46.9 | 39.2 | 13.9 |
| Event hall 1 | 44.5 | 43.8 | 11.7 |
| Event hall 2 | 45.6 | 38.6 | 15.8 |

In additional tests it was found that smaller amounts of these fatty acids were present in the solid and aqueous phase of the collected brown grease samples (data not shown).

Example 2

Esterification of 0.4 ml oleic acid and linoleic acid (reference standards) (see, Scheme 2 above) with methanol was performed using $BF_3$-MeOH (14%, 7 ml, Lewis acid and reactant), NaOH (0.5 M in methanol, 6 ml, catalyst) and 5 ml n-Hexane while heating the reaction mixture at 70° C. for 10-15 minutes.

The mixtures were tested in HPLC as described hereinabove before and after the reaction, and the obtained chromatograms are presented in FIG. 4. As can be seen, most of the fatty acids were converted to their methyl esters and formed a biodiesel.

In additional studies, the same reaction conditions were applied to a mixture of oleic acid and glyceryl trioleate (GTO), but without NaOH: 0.4 ml oleic acid or glyceryl trioleate, 4.9 ml $BF_3$-MeOH (14%), 8.1 ml methanol and 5 ml n-Hexane were mixed while heating the reaction mixture at 70° C. for 10-15 minutes.

After the reaction, two phases are present (methanol lower phase and n-hexane upper phase), and at least most of the product (biodiesel) is in the upper phase.

FIGS. 5A-D present comparative HPLC chromatograms of the lower phase with (FIG. 5A) and without (FIG. 5C) NaOH, and of the upper phase with (FIG. 5B) and without (FIG. 5D) NaOH. As can be seen, the upper phase, which contains the biodiesel, is not affected by the absence of NaOH.

FIGS. 6A-C present chromatograms of GTO (FIG. 6A), of the mixture obtained after the trans-esterification reaction (FIG. 6B) and of a commercially available methyl ester of GTO (FIG. 6C). As can be seen, the reaction proceeds towards biodiesel production in high yield in the absence of NaOH.

Example 3

The esterification of oleic acid in the presence of $BF_3$ as a Lewis acid catalyst (without NaOH) was tested at ambient temperature while sonicating the reaction mixture for 1, 2, 5, 10 and 15 minutes.

The reaction was performed in a batch tank reactor by addition of 0.4 ml oleic acid, 4.9 ml of 14% (by weight) $BF_3$ in MeOH, 8.1 ml methanol and 5 ml n-Hexane, using a Sonicator ultrasonic processor (QSUNICA, USA), with a frequency of 20 kHz or ultrasonic bath WUG-AO2H (Wise Clean Company, Korea) with a frequency of 28 kHz or ultrasonic bath Elmasonic (Elma, Germany) with multifrequency 37/80 kHz.

After the reaction, two phases are present (methanol lower phase and n-hexane upper phase), and at least most of the product (biodiesel) is in the upper phase.

The obtained data is shown in FIG. 7 and it can be seen that the reaction proceeds efficiently under sonication, in a time-independent fashion.

The reaction was further tested using varying amounts of the $BF_3$ catalyst, and the obtained data is shown in FIG. 8. As can be seen, the reaction yields depend on the catalyst amount, and 100% yield is obtained at a catalyst concentration of 5.33% by weight and upon a reaction time of 5 minutes.

Example 4

Esterification of FFAs using solid catalysts, which avoid or reduce solubilisation of the catalyst during the reaction and thereby enable re-use of the catalysts and/or performing a continuous process, was practiced. The Lewis acid catalysts were incorporated into silica matrices by applying the sol-gel synthetic route.

Immobilization of Lewis Acid by Entrapment in Silica Matrix:

Entrapment of $ZnCl_2$:

Tetraethyl orthosilicate (TEOS) (25 mL, 0.11 mol) was dissolved in ethanol (26 mL) and a mixture of $H_2O$ (8 mL) and HCl 37% (0.185 mL) was added dropwise to this solution. The obtained mixture was stirred for 10 minutes. A catalyst aqueous solution was prepared by adding a desired amount of the catalyst (3.8 grams, 0.028 mol or 1.9 grams, 0.014 mol of $ZnCl_2$) to 5.0 mL of water and added to the TEOS solution. The mixture solution was stirred for 30 minutes. The suspension was kept for gelation and drying at room temperature for 3 weeks. The matrix obtained was then dried in vacuum oven for six hours (40° C., 30 cm Hg), and the obtained dried matrix was kept in a desiccator. The matrix was ground into powder by pestle and mortar prior to use.

Entrapment of $BF_3$:

TEOS (25 mL, 0.11 mol) was dissolved in ethanol (26 mL) and a mixture of $H_2O$ (8 mL) and HCl 37% (0.185 mL) was added dropwise to this solution. The obtained mixture was stirred for 10 minutes. Then 10.8 mL of $BF_3$-Me solution (20% $BF_3$ in methanol) was added. The mixture solution was stirred for 30 minutes. The obtained suspension was kept for gelation and drying at room temperature for 3 weeks as described hereinabove and was treated prior to use as in described hereinabove.

Entrapment of $AlCl_3$:

TEOS (25 mL, 0.11 mol) was dissolved in ethanol (26 mL) and a mixture of $H_2O$ (8 mL) and HCl 37% (0.185 mL) was added dropwise to this solution. The obtained mixture was stirred for 30 minutes. The suspension was kept for gelation at room temperature for 2 weeks until most of the water evaporated and a viscous gel was obtained. 3.76 grams (0.028 mol) of $AlCl_3$ dissolved in 20.0 mL of ethanol was added to the gel and the mixture was vigorously stirred for 15 minutes. The wet gel was kept for drying for 2 weeks and further treated, as in described hereinabove.

Biodiesel Production:

The esterification of oleic acid in the presence of the immobilized Lewis acid catalyst (without NaOH) was tested at ambient temperature while sonicating the reaction mixture for 15 minutes. The reaction was performed in a batch tank reactor in which a sol-gel matrix entrapping a catalyst was placed and to which 0.4 ml oleic acid, 8.1 ml methanol and 5 ml n-Hexane, were added. Sonication was performed using a Sonicator ultrasonic processor (QSUNICA, USA), with a frequency of 20 kHz or ultrasonic bath WUG-AO2H (Wise Clean Company, Korea) with a frequency of 28 kHz or ultrasonic bath Elmasonic (Elma, Germany) with multi-frequency 37/80 kHz.

After the reaction, two phases are present (methanol lower phase and n-hexane upper phase), and the product (biodiesel) is in both the upper and lower phases.

The obtained data is shown in FIG. 9 and it can be seen that all the immobilized Lewis acids showed an ability to catalyze the esterification reaction already after 15 minutes of ultrasonic treatment without additional heating and can be used for biodiesel production. Catalyzing the reaction by immobilized $AlCl_3$ under these conditions gained biodiesel production at a yield of about up to 86% and by immobilized $BF_3$ at a yield of up to 90%. The yield can be increased by elongation to of the reaction time, that is, the time at which the reagents mixture and the immobilized catalyst are contacted under sonication (data not shown).

The immobilized catalyst was thereafter separated from the reaction mixture, contacted again with 0.4 ml oleic acid, 8.1 ml methanol and 5 n-Hexane, and the same sonication was applied. As shown in FIG. 9 (dashed bars), the re-used (recycled) catalyst remained active in generating biodiesel, and a decrease of less than 10% and up to 50% was observed from the immobilized $BF_3$ and $AlCl_3$, respectively.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

LIST OF REFERENCE CITED

Banerjee, a. & Chakraborty, R., 2009. Parametric sensitivity in transesterification of waste cooking oil for biodiesel production—A review. Resources, Conservation and Recycling 53, 490-497.

Barbosa, S. L., Dabdoub M. J., Hurtado G. R., Klein S. I., Baroni A. C. M, Cunha C., 2006. Solvent free esterification reactions using Lewis acids in solid phase catalysis. Applied Catalysis A: General 313, 146-150.

Canakci, M. & Gerpen, J. Van, 2001. Biodiesel production from oils and fats with high free fatty acids. Transactions of the ASAE 44, 1429-1436.

Casas, A., Ramos M. J., Rodríguez J. F., Pérez Á. 2013. Tin compounds as Lewis acid catalysts for esterification and transesterification of acid vegetable oils. Fuel Processing Technology 106, 321-325.

Chai, M., Tu Q., Lu M., Yang Y. J., 2014. Esterification pretreatment of free fatty acid in biodiesel production, from laboratory to industry. Fuel Processing Technology, 125, 106-113.

Chakrabarti, A. R., Hake, J. M., Zarchi, I., Gray, D. M. D., 2008. Waste grease biodiesel production at a wastewater treatment plant. In: Proceedings of the Water Environment Federation, 2770-2789.

Cintas, P., Mantegna S., Gaudino E. C., Cravotto G., et al., 2010. A new pilot flow reactor for high-intensity ultrasound irradiation. Application to the synthesis of biodiesel. Ultrasonics Sonochemistry 17, 985-989.

Encinar, J. M., Gonzalez, J. F., Pardal, A. 2012. Transesterification of castor oil under ultrasonic irradiation conditions. Preliminary results. Fuel Processing Technology 103, 9-15.

Gabel, D., Pekarek, S., Nolkemper, D., Kalis, M., 2009. Sustainability incorporated into the solids handling improvements of the Douglas L. Smith Middle Basin municipal sludge and fat, oil, and grease at mesophilic conditions. Water Environ. Res. 80, 212-221.

He, X., Iasmin, M., Dean, L. O., Lappi, S. E., Ducoste, J. J. and de los Reyes, F. L., 2011. Evidence for fat, oil and grease (FOG) deposit formation. Environmental Science & Technology 45, 4385-4391.

Hingu, S. M., Gogate, P. R. & Rathod, V. K., 2010. Synthesis of biodiesel from waste cooking oil using sonochemical reactors. Ultrasonics Sonochemistry 17, 827-832.

Lam, M. K., Lee, K. T. & Mohamed, A. R., 2010. Homogeneous, heterogeneous and enzymatic catalysis for transesterification of high free fatty acid oil (waste cooking oil) to biodiesel: A review. Biotechnology Advances 28, 500-518.

Long, J. H. et al., 2012. Anaerobic co-digestion of fat, oil, and grease (FOG): A review of gas production and process limitations. Process Safety and Environmental Protection 90, 231-245.

Meher, L. C., Vidya Sagar, D. & Naik, S. N., 2006. Technical aspects of biodiesel production by transesterification—A review. Renewable and Sustainable Energy Reviews 10, 248-268.

Pukale, D., Maddikeri, G., Gogate, P., Pandit, A., Pratap, A., 2015. Ultrasound assisted transesterification of waste cooking oil using heterogeneous solid catalyst. Ultrasonics Sonochemistry 22, 278-286.

Rajković, K., Avramović, J., Milić, P., Stamenković, O., Veljkovic, V., 2013. Optimization of ultrasound-assisted base-catalyzed methanolysis of sunflower oil using response surface and artificial neural network methodologies. Chemical Engineering Journal 215-216, 82-89.

Romero, R., Martínez, S. L. & Natividad, R., 2011. Biodiesel production by using heterogeneous catalysts. Alternative Fuel, 3-20.

Salamatinia, B., Abdullah, A. Z. & Bhatia, S., 2012. Quality evaluation of biodiesel produced through ultrasound-assisted heterogeneous catalytic system. Fuel Processing Technology, 97, 1-8.

Santos, A. M., Martinez, M. & Mira, J. A., 1996. Comparison study of Lewis acid type catalysts on the esterification of octanoic acid and n-octyl alcohol. Chem Eng Technol, 9, 538-542.

Sun, H-B, Hua, R. and Yin, Y., 2006. $ZrOCl_2.8H_2O$: An efficient, cheap and reusable catalyst for the esterification of acrylic acid and other carboxylic acids with equimolar amounts of alcohols, 4, 263-271.

Suto, P., Gray, D. M. D., Larsen, E., Hake, J., 2006. Innovative anaerobic digestion investigation of fats, oils, and grease. In: Proceedings of the Water Environment Federation, 858-879.

Talha, N. S. & Sulaiman, S., 2016. Overview of catalysts in biodiesel production. ARPN Journal of Engineering and Applied Sciences, 11, 439-448.

Teixeira, L. S. G. et al., 2009. Comparison between conventional and ultrasonic preparation of beef tallow biodiesel. Fuel Processing Technology, 90, 1164-1166.

Wang, L., Aziz T. N., Ducoste J., de los Reyes F. L., 2012. Anaerobic co-digestion of grease trap waste. Proceedings of the Water Environment Federation, 10, 5428-5434.

What is claimed is:

1. A process of generating an alkyl ester of a fatty acid from a free fatty acid-containing substance, the process comprising:

introducing a mixture comprising the free fatty acid-containing substance, an organic aprotic solvent and a respective alcohol into a reactor that is in acoustic communication with an ultrasound transducer;

contacting said mixture with a Lewis acid; and applying on said reactor ultrasound energy at a frequency of at least 20 kHz, to thereby generate the alkyl ester of the fatty acid by esterification of the free fatty acid, wherein said contacting and said applying is at an ambient temperature, wherein the contacting and the applying of the ultrasound energy are effected substantially at the same time, wherein said free fatty acid-containing substance comprises a free fatty acid in an amount of at least 50% by weight, wherein said alcohol and/or said free fatty acid-containing substance is immiscible with said organic aprotic solvent, and wherein said organic aprotic solvent is an alkane, or a mixture of alkanes, or alkenes, alkynes or a mixture of one or more of an alkane, alkene and alkyne, and has a boiling temperature that is higher than 40° C.

2. The process of claim 1, wherein said free fatty acid-containing substance further comprises a triglyceride, the process being further of generating alkyl esters of one or more fatty acids corresponding to the triglyceride by transesterification of said triglyceride.

3. The process of claim 1, wherein said free fatty acid-containing substance is a liquid waste.

4. The process of claim 1, wherein said free fatty acid-containing substance is a Brown Grease.

5. The process of claim 1, wherein said mixture is devoid of an alkaline substance.

6. The process of claim 1, wherein said mixture is devoid of NaOH.

7. The process of claim 1, wherein said mixture comprises water.

8. The process of claim 1, wherein the alkyl ester of the fatty acid is dissolvable or miscible in said organic solvent.

9. The process of claim 1, wherein an amount of said organic solvent ranges from 5:1 to 1:5, relative to an amount of said alcohol.

10. The process of claim 1, wherein an amount of said Lewis acid is in a range of from 0.1 to 10% or from 1 to 10%, by weight, of the total amount of the mixture and of the Lewis acid.

11. The process of claim 1, wherein applying said ultrasound energy is for a time period that ranges from 1 to 30 minutes.

12. The process of claim 1, wherein said Lewis acid is in a solid form.

13. The process of claim 1, wherein said Lewis acid is in a gaseous form.

14. The process of claim 1, wherein said contacting is performed in a continuous manner.

15. The process of claim 14, wherein said Lewis acid is in a solid form, and said reactor comprises said Lewis acid is in a non-dispersible solid form, and wherein said contacting comprises continuously introducing said mixture into said reactor.

16. The process of claim 14, wherein said Lewis acid is in a gaseous form, and wherein said mixture and a liquid form of said Lewis acid are introduced to said reactor, and wherein following said applying of said ultrasound energy, a liquid phase comprising said alkyl ester of said fatty acid is separated from a gaseous phase comprising said Lewis acid in a gaseous form, and said gaseous form of said Lewis acid is condensed into said liquid form and is re-contacted with said mixture.

17. An alkyl ester of a fatty acid obtained by the process of claim 1, the alkyl ester of the fatty acid being devoid of an alkaline substance or of cations derived from said alkaline substance.

18. The process of claim 1, wherein said organic aprotic solvent is selected from hexane, heptane and octane.

* * * * *